(12) United States Patent
Lin (10) Patent No.: US 7,048,170 B2
(45) Date of Patent: May 23, 2006

(54) NAIL MAGAZINE (75) Inventor: Mu-Fa Lin, Tali (TW)

(73) Assignee: Evening Star International, Inc., Conroe, TX (US)

( * ) Notice: Subject to any disclaimer, the term of this patent is extended or adjusted under 35 U.S.C. 154(b) by 0 days.

(21) Appl. No.: 10/616,747

(22) Filed: Jul. 9, 2003

(65) Prior Publication Data
US 2004/0245311 A1    Dec. 9, 2004

(30) Foreign Application Priority Data
May 15, 2003   (TW) .............................. 92208897 U (51) Int. Cl.
*B25C 5/02*   (2006.01)
(52) U.S. Cl. .................... 227/137; 227/119; 227/135
(58) Field of Classification Search ................ 227/137, 227/119, 135
See application file for complete search history.

(56) References Cited

U.S. PATENT DOCUMENTS

| | | | | |
|---|---|---|---|---|
| 3,558,031 A | * | 1/1971 | Hillier | 227/7 |
| 3,708,097 A | * | 1/1973 | Fisher | 227/136 |
| 4,585,154 A | * | 4/1986 | Fealey et al. | 227/109 |
| 4,669,648 A | * | 6/1987 | Monacelli | 227/109 |
| 5,810,239 A | * | 9/1998 | Stich | 227/119 |
| 6,431,427 B1 | * | 8/2002 | Leitner | 227/119 |
| 6,604,665 B1 | * | 8/2003 | Gabriel | 227/120 |

* cited by examiner

*Primary Examiner*—Scott A. Smith
*Assistant Examiner*—Brian Nash
(74) *Attorney, Agent, or Firm*—Fulbright & Jaworski L.L.P.

(57) ABSTRACT

A nail magazine for use in a power nailing hand tool to hold and feed a rolled belt of nails is constructed to include a casing, a magazine shaft vertically disposed inside the casing at the center, the magazine shaft having an upright shaft at the center inside the casing and a nail carrier sleeve vertically movably supported on a magazine spring around the upright shaft and adapted to carry a rolled belt of nails for feeding, and a cover hinged to the casing, the cover defining with the casing a nail feed hole when closed on the casing.

11 Claims, 9 Drawing Sheets

NAIL MAGAZINE

BACKGROUND OF THE INVENTION

1. Field of the Invention

The present invention relates to a nail magazine for use in a power nailing hand tool and, more particularly, to such a nail magazine, which is practical for use to feed L-shaped nails for fastening asbestos slats or light angle bars.

2. Description of the Related Art

Figure 1:
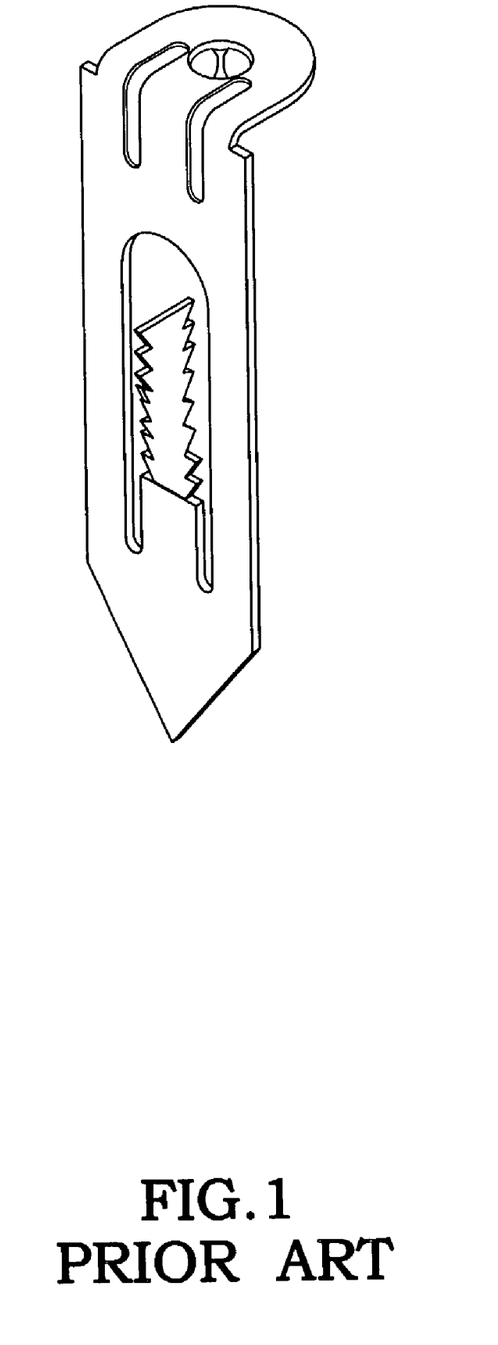
FIG. 1 illustrates a conventional L-shaped nail to be used in the nail magazine of the present invention.

FIG. 1 shows a conventional L-shaped nail for use in a power nailing hand tool to which the invention pertained. The L-shaped nail has a flat elongated nail body, an angled head extended from the top end of the nail body, a point extended from the bottom end of the nail body, and an upwardly extended and biased toothed strip on the middle. This design of L-shaped nail is suitable for fastening asbestos slats, thin-layer angle bars, and other thin-layer sheet materials. The flat body can easily be driven into the workpiece, preventing breaking of the workpiece. The toothed strip enhances the positioning of the nail body in the workpiece. When in use, L-shaped nails are fastened together by a belt or tape, and then the belt of nails is rolled up and loaded in the nail magazine of a power nailing hand tool for fastening.

Figure 2:
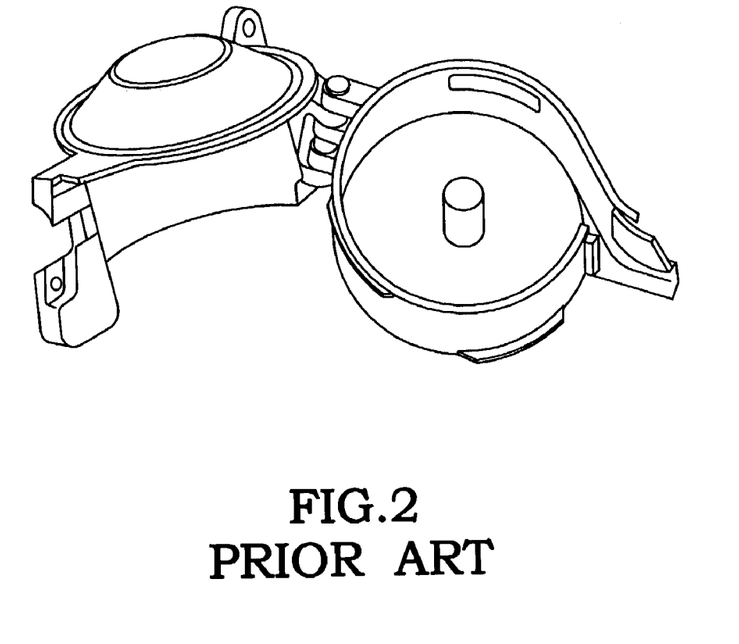
FIG. 2 illustrates the structure of a nail magazine according to the prior art.
Figure 3:
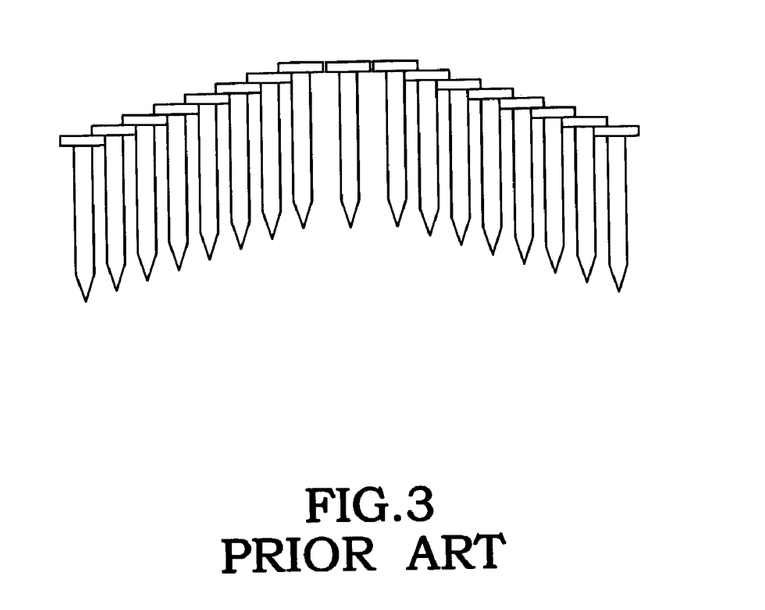
FIG. 3 is a schematic drawing showing the rolling arrangement of a belt of round nails according to the prior art.
Figure 4:
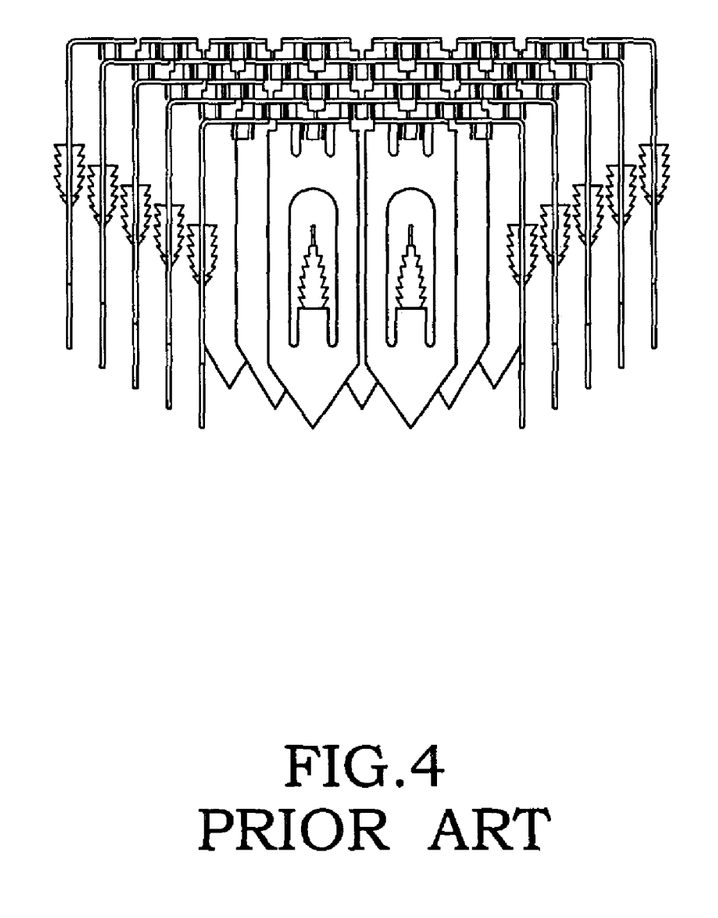
FIG. 4 shows a conventional belt of L-shaped nails rolled up.

FIG. 2 shows a nail magazine constructed according to the prior art and adapted to hold and feed round nails as shown in FIG. 3. This structure of nail magazine comprises a casing with an upright center shaft, and a cover hinged to the casing and adapted to hold down a belt of nails in the casing around the upright center shaft. The casing has a nail feed hole for output of nails one after another. When viewed from one side after a belt of round nails has been rolled up, the heads of the nails at an outer layer are respectively supported below the heads of the nails of at an inner layer (see FIG. 3). However, when a belt of L-shaped nails rolled up, the angled heads of the nails at an outer layer are respectively rested on the angled heads of the nails at an inner layer. Therefore, the conventional nail magazine shown in FIG. 2 is not practical for feeding L-shaped nails.

SUMMARY OF THE INVENTION

The present invention has been accomplished under the circumstances in view. It is the main object of the present invention to provide a nail magazine, which is practical for feeding L-shaped nails. It is another object of the present invention to provide a nail magazine, which automatically adjust the position of the loaded belt of nails subject to the feeding of nails.

To achieve these and other objects of the present invention, the nail magazine is used in a power nailing hand tool to hold and feed a rolled belt of nails comprised of a plurality of substantially L-shaped nails fastened together by a belt, each nail of the belt of nails having a flat elongated nail body, an angled head extended from a top end of the nail body, a point extended from a bottom end of the nail body, and an upwardly extended and biased toothed strip on the middle of the nail body. The nail magazine comprises a casing; a magazine shaft vertically disposed inside the casing at the center, the magazine shaft comprising an upright shaft perpendicularly upwardly extended from the center of the bottom wall of the casing, and a nail carrier sleeve vertically movably mounted around the upright shaft and adapted to carry the rolled belt of nails and to support the angled heads of the nails of the inner layer of the rolled belt of nails; and a cover hinged to the casing, the cover defining with the casing a nail feed hole when closed on the casing.

DETAILED DESCRIPTION OF THE PREFERRED EMBODIMENT

Figure 5:
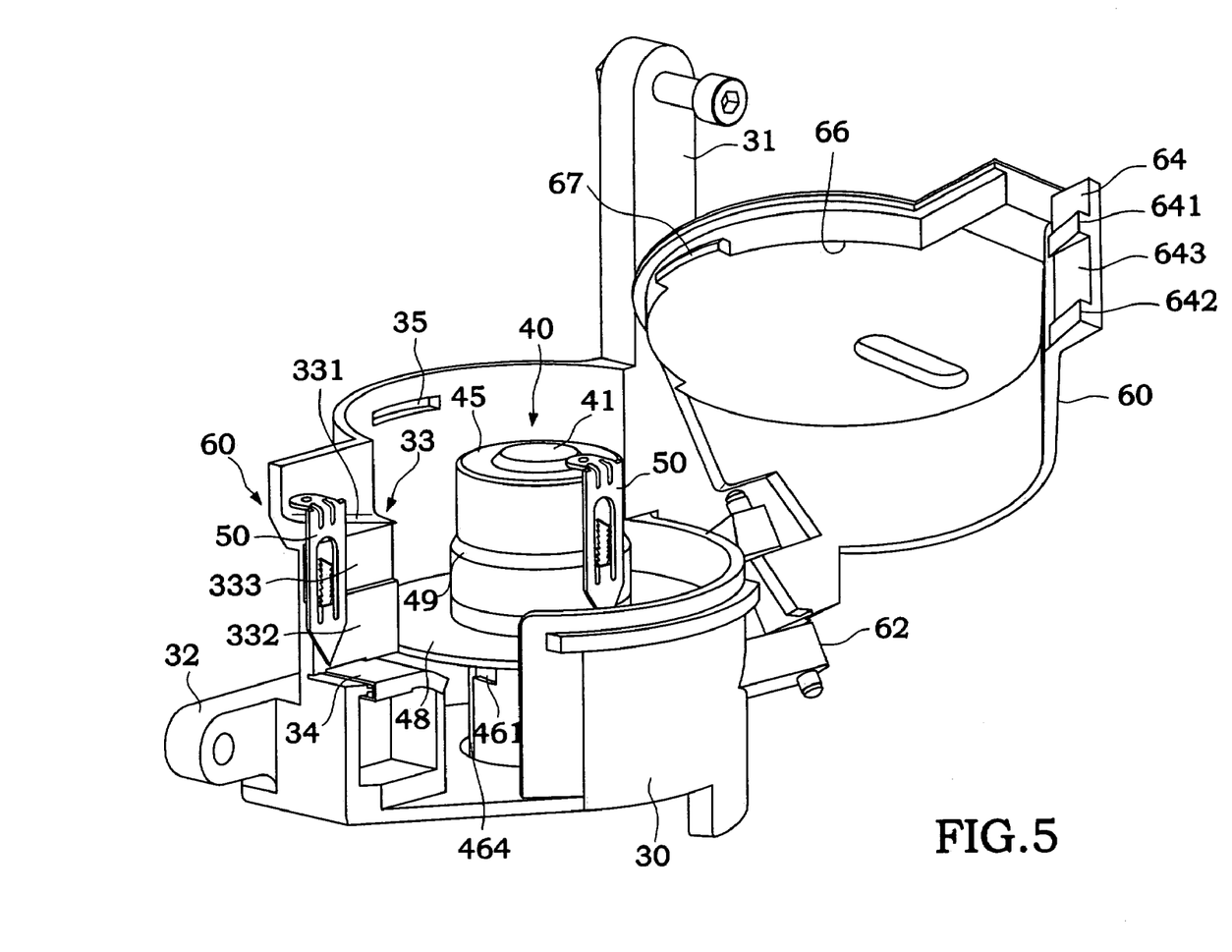
FIG. 5 is a perspective view showing the opened status of a nail magazine according to the present invention.
Figure 6:
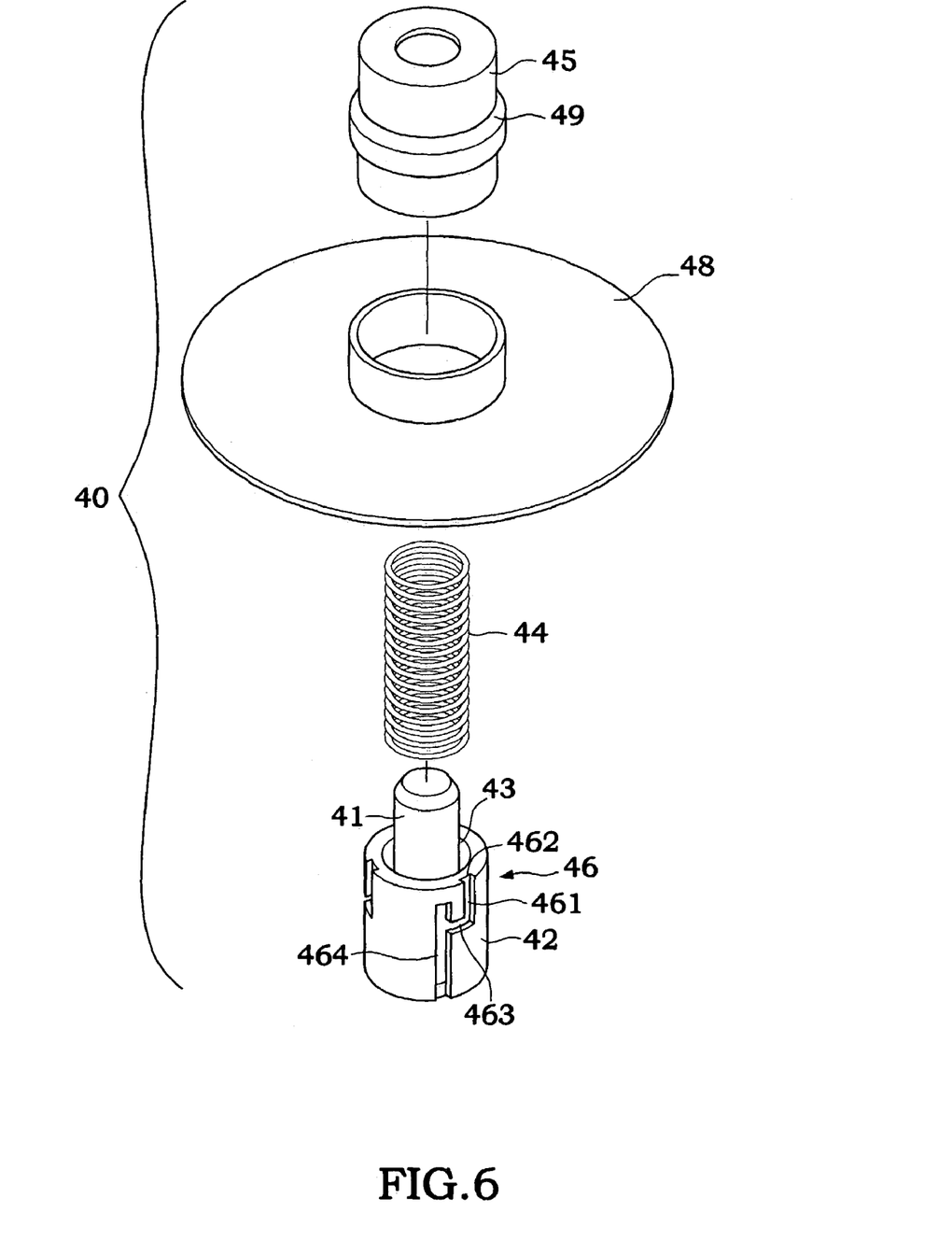
FIG. 6 is an exploded view of the magazine shaft for the nail magazine according to the present invention.
Figure 7A:
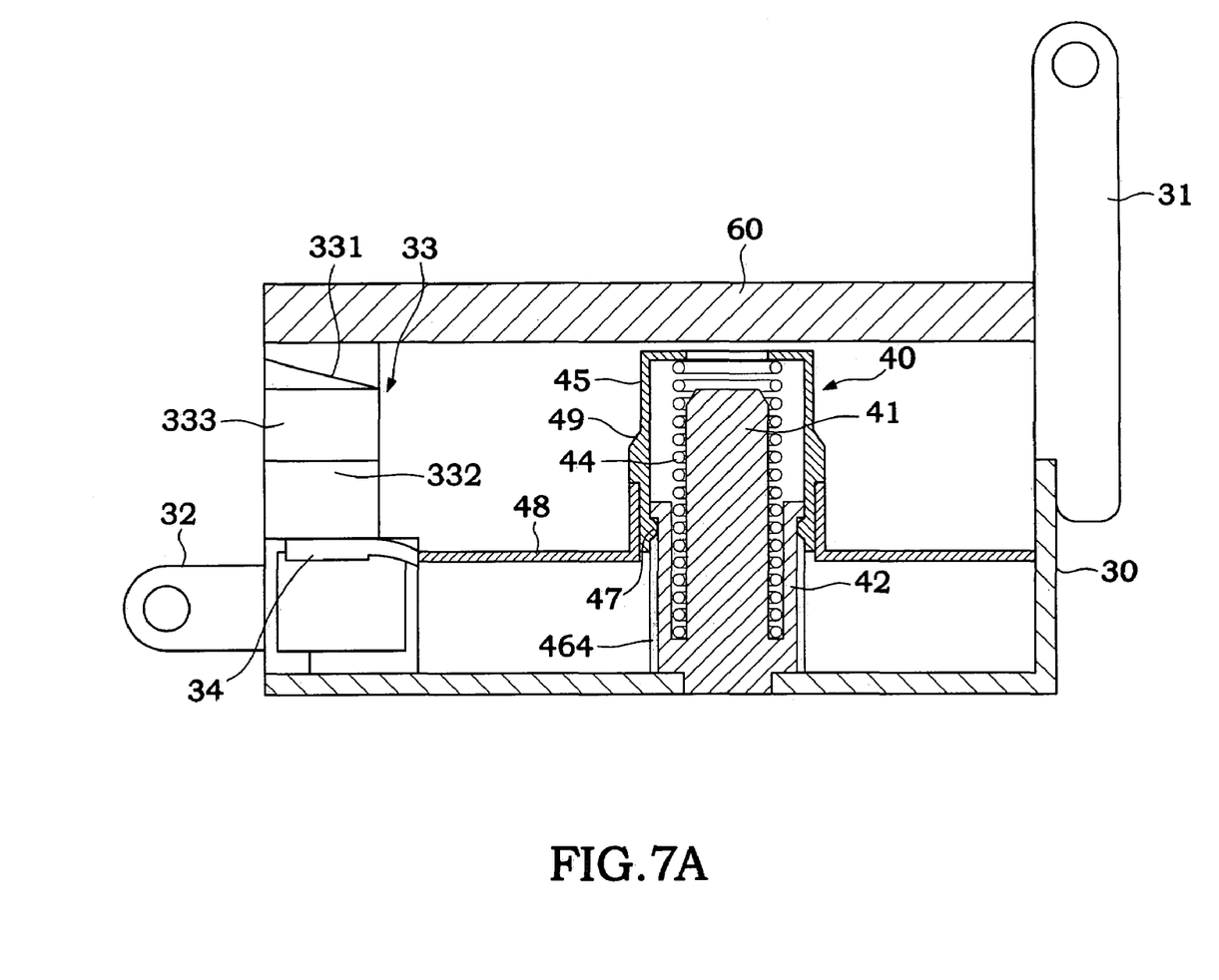
FIG. 7A is a sectional view of the nail magazine before loading of nails according to the present invention.

Referring to FIGS. 5, 6, and 7A, a nail magazine in accordance with the present invention is shown comprising a casing 30, a magazine shaft 40, belts of nails 50, and a cover 60.

The casing 30 is a hollow circular open frame member having a vertical mounting rod 31 upwardly extended from the periphery at one side, a horizontal mounting rod 32 perpendicularly extended from the periphery at one peripheral open side thereof remote from the vertical mounting rod 31, a retaining hole 35 in the periphery, a stepped nail feeding wall 33 in the peripheral open side, and a wear resistant guide face 34 at the bottom side of the stepped nail feeding wall 33. The stepped nail feeding wall 33 defines an inwardly sloping upper tread 331, a lower tread 332, and a riser 333 between the upper tread 331 and the lower tread 332.

The magazine shaft 40 is vertically located on the center inside the casing 30, comprising a shaft 41 fixedly upwardly extended from the center of the bottom wall of the casing 30, a tubular flange 42 formed integral with the periphery of the shaft 41 and defining with the periphery of the shaft 41 an annular groove 43, a magazine spring 44 mounted in the annular groove 43 around the periphery of the shaft 41, and a nail carrier sleeve 45 axially movably sleeved onto the and supported on the magazine spring 44 above shaft 41. The tubular flange 42 has at least one, for example, two vertically extended and substantially h-shaped guide grooves 46 formed in the periphery. Each guide groove 46 comprises a top open end 462, a short vertical section 461 downwardly extended from the top open end 462, a long vertical section 464 vertically extended toward the bottom side of the tubular flange 42, a transverse section 463 connected between the bottom end of the short vertical section 461 and an upper part of the long vertical section 464, and a circular guide plate 48 fastened to the periphery of the nail carrier sleeve 45 and peripherally disposed in contact with the inside wall of the casing 30 to guide vertical movement of the nail carrier sleeve 45 smoothly and stably. The long vertical section 464 has two ends closed. The nail carrier sleeve 45 comprises at least one, for example, two raised portions 47 projected from the inside wall and respectively coupled to the guide grooves 46. By means of inserting the raised portions 47 through the top open end 463 into the short vertical section 461 of each guide groove 46 and then rotating the nail carrier sleeve 45 relative to the tubular flange 43 through an angle to move the raised portions 47 through the transverse section 463 of each guide groove 46 to the respective long vertical section 464, the nail carrier sleeve 45 is coupled to the tubular flange 43 and can be moved vertically up and down along the long vertical section 464 of each guide groove 46.

Each belt of nails 50 is comprised of a plurality of substantially L-shaped nails fastened together by a belt or the like, each nail having a flat elongated nail body, an angled head extended from the top end of the nail body, a point extended from the bottom end of the nail body, and an upwardly extended and biased toothed strip on the middle (The nails of the belt of nails are of the conventional products, no reference signs or numbers are used in the drawings to indicate the angled head, nail body, point, and toothed strip of each nail). When rolling up one belt of nails 50, the angled heads of the nails of an outer layer are respectively rested on the angled heads of the nails of an inner layer. After one belt of nails 50 has been rolled up, it is put in the casing 30 around the nail carrier sleeve 45 with the angled head of the nail at the center rested on the top side of the nail carrier sleeve 45. In order to fit the configuration of the nails, the nail carrier sleeve 45 is made having a collar 49 around the periphery that prevents direction contact of the toothed strip of each nail of the belt of nails 50 with the periphery of the nail carrier sleeve 45.

The cover 60 is fastened to the casing 30 by a hinge 62 and adapted to close the casing 30, having a retaining rib 67 formed in the inside wall for engaging into the retaining hole 35 to lock the cover 60 to the casing 30, a nail feeding wall 64 formed in the peripheral open side corresponding to the nail feeding wall 33 of the casing 30. When the cover 60 is closed, the nail feeding walls 33 and 64 form a nail feed hole 65 (see FIG. 8), and the flat inside top wall 66 of the cover 60 is pressed on the angled heads of the nails of the belt of nails 50. The nail feeding wall 64 defines two triangular steps 641 and 642 and a vertical face 643 disposed between the steps 641 and 642.

Referring to FIG. 7A, when the nail magazine is empty, the magazine spring 44 supports the nail carrier sleeve 45 in the upper limit position where the raised portions 47 of the nail carrier sleeve 45 are respectively at the closed top ends of the long vertical sections 464 of the guide grooves 46, and therefore the nail carrier sleeve 45 does not fall from the tubular flange 43.

Figure 7B:
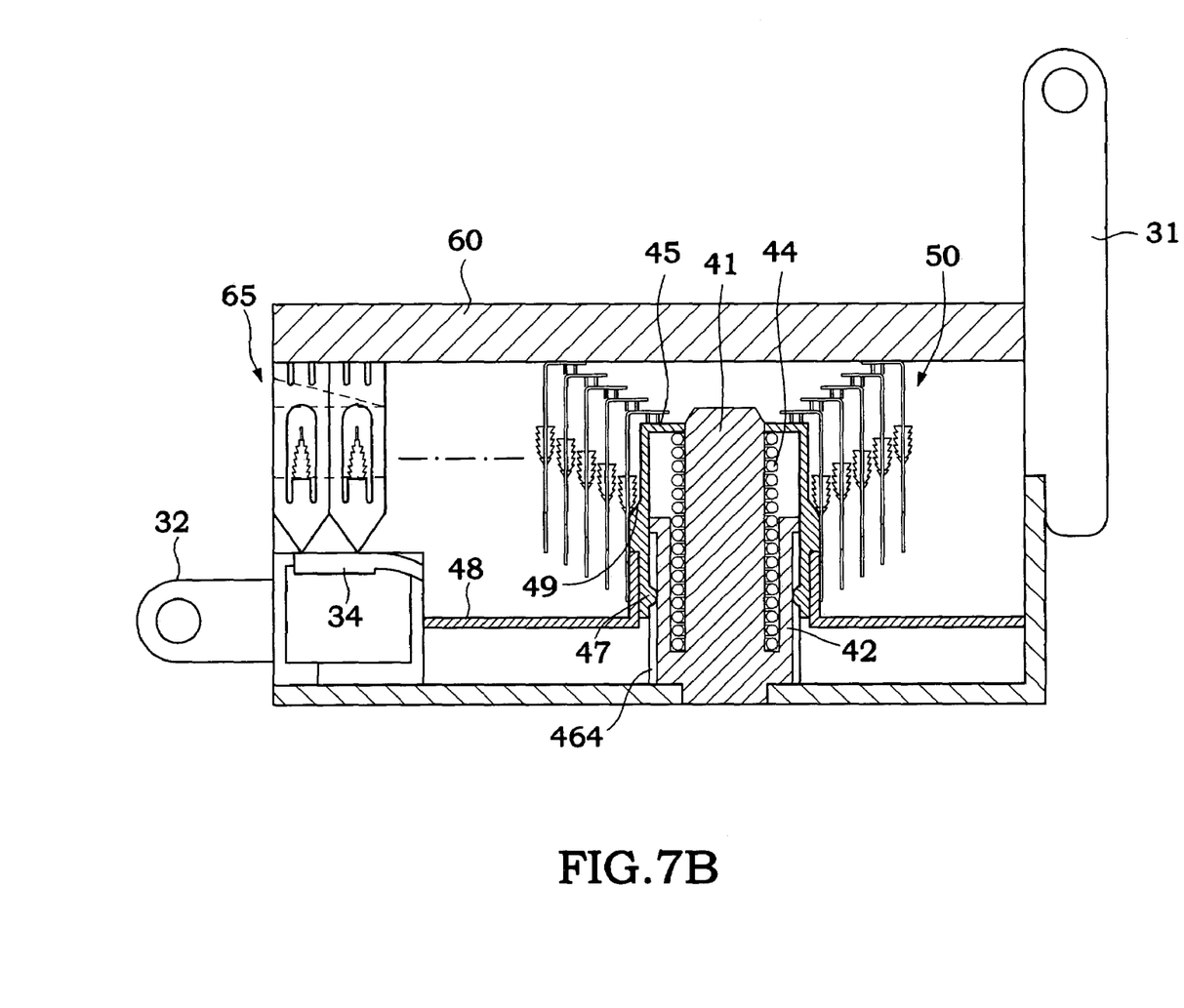
FIG. 7B is similar to FIG. 7A but showing one rolled belt of nails loaded.

Referring to FIG. 7B, after loading of one belt of nails 50 in the magazine shaft 40, the lead end of the belt of nails 50 is pulled outward toward the nail feeding wall 33 of the casing 30, for enabling the angled head of the first nail of the belt of nails 50 to be rested on the upper tread 331, and then the cover 60 is closed to hold down the belt of nails 50, keeping the toothed strips of the leading nails of the belt of nails 50 suspended in between the riser 333 and the vertical face 643.

Figure 8:
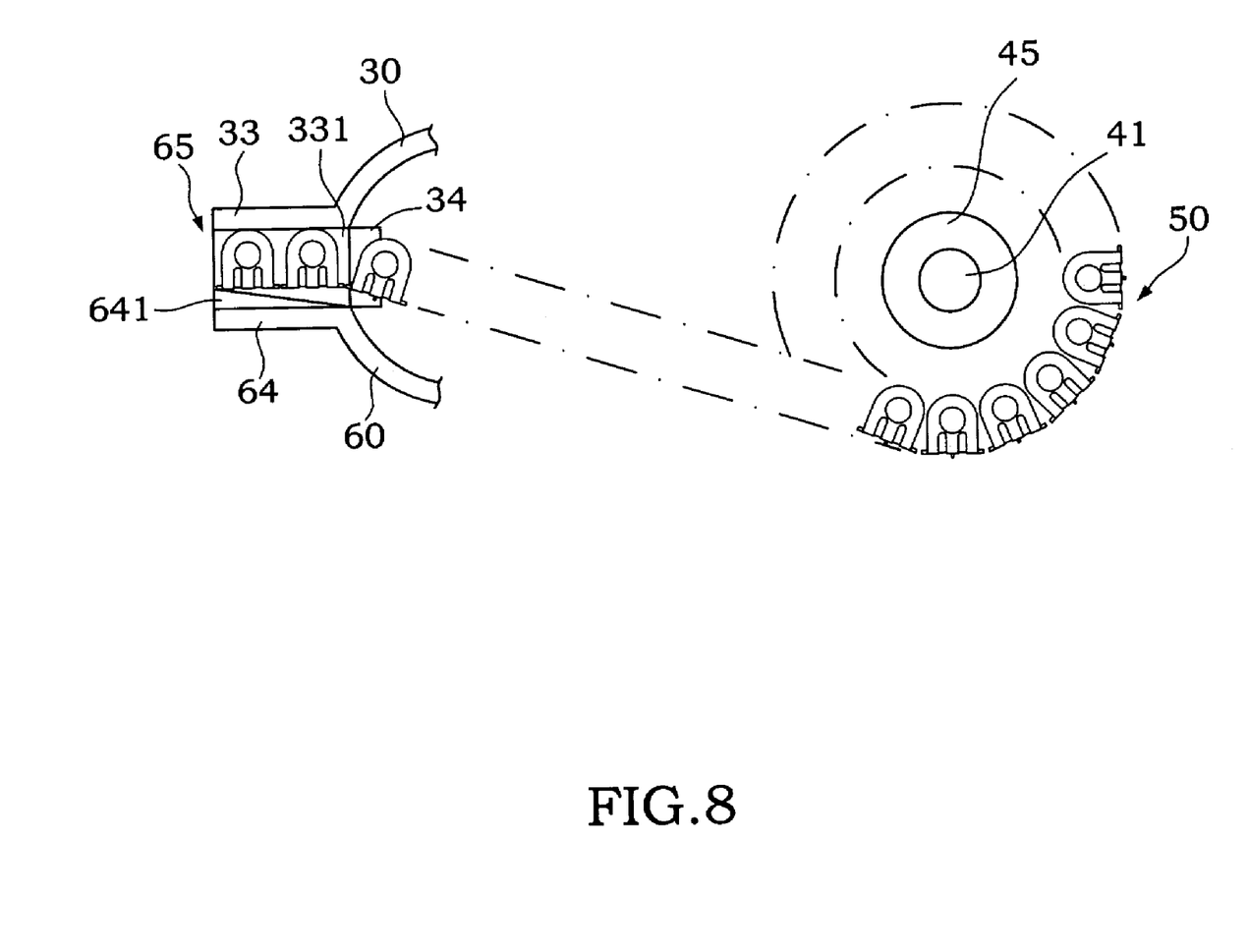
FIG. 8 is a schematic top plain view of a part of the present invention, showing the feeding of nails into the nail feed hole.

After the loading of a complete belt of nails 50, the cover 60 is closed to hold down the loaded belt of nails 50, and the magazine spring 44 is compressed. At this time, the raised portions 47 of the nail carrier sleeve 45 are moved to the closed bottom ends of the long vertical sections 464 of the guide grooves 46, and the loaded belt of nails 50 are firmly supported in between the casing 30 and the cover 60, keeping the leading nails in line with the nail feed hole 65. As illustrated in FIG. 8, the triangular steps 641 and 642 provide the nail feed hole 65 with an output space having a width gradually reducing toward the outside, and the inwardly sloping tread 331 of the nail feeding wall 33 guides the nails of the loaded belt of nails 50 to move into the nailing position in the nail feed hole 65 smoothly. The wear resistant guide face 34 supports and guides the movement of the points of the nails of the loaded belt of nails 50.

Figure 7C:
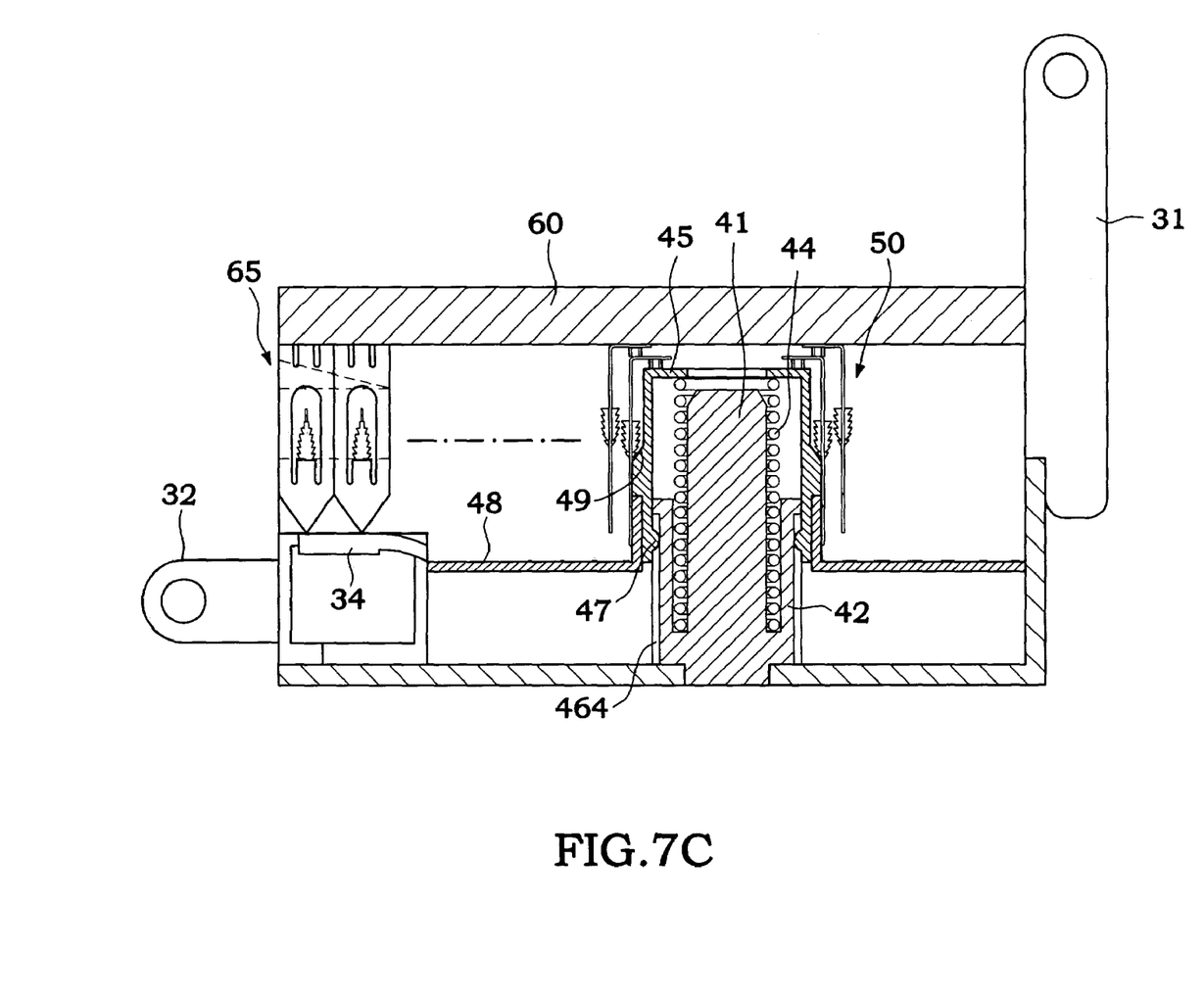
FIG. 7C is similar to FIG. 7B but showing the quantity of nails reduced, the rolled belt of nails lowered.

Referring to FIG. 7C, when nails are driven out of the nail magazine one after another, the magazine spring 44 imparts an upward pressure to the sleeve 50, and the circular guide plate 48 guides vertical movement of the sleeve 50 along the long vertical sections 464 of the guide grooves 46 subject to the feeding of the loaded belt of nails 50, and therefore feeding nails are constantly maintained in line with the nail feed hole 65.

Further, the arrangement of the guide grooves 46 must match with the pulling force of the feeding of the loaded belt of nails 50, i.e., the rotary force employed to the nail carrier sleeve 45 upon feeding of the loaded belt of nails 50. The pulling force of the feeding of the loaded belt of nails 50 cause the raised portions 47 to be moved in direction away from the transverse sections 463 of the guide grooves 46, preventing disconnection of the raised portions 47 from the guide grooves 46 of the tubular flange 43.

A prototype of nail magazine has been constructed with the features of FIGS. 5~8. The nail magazine functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A nail magazine used in a power nailing hand tool to hold and feed a rolled belt of nails comprised of a plurality of substantially L-shaped nails fastened together by a belt, each nail of said belt of nails having a flat elongated nail body, an angled head extended from a top end of said nail body, a point extended from a bottom end of said nail body, and an upwardly extended and biased toothed strip on the middle of said nail body, in said rolled belt of nails the angled heads of the nails of an outer layer are respectively rested on the angled heads of the preceding inner layer, the nail magazine comprising:

a casing;

a magazine shaft vertically disposed inside said casing at the center, said magazine shaft comprising an upright shaft upwardly extended from the center of a bottom wall inside said casing, and a nail carrier sleeve vertically movably mounted around said upright shaft and adapted to carry said rolled belt of nails and to support the angled heads of the nails of the inner layer of said rolled belt of nails;

a cover hinged to said casing, said cover defining with said casing a nail feed hole when closed on said casing;

a spring for continuously biasing said angled heads of said outer layer of said rolled belt of nails into engagement with said cover thereby keeping the nail in line with said nail feed hole hole; and said magazine shaft further comprises a tubular flange formed integral with the periphery of said upright shaft and defining with the periphery of said upright shaft an annular groove, said spring being received within said groove.

2. The nail magazine as claimed in claim 1, wherein said magazine shaft further comprises a circular guide plate fastened to the periphery of said nail carrier sleeve and peripherally disposed in contact with an inside wall of said casing to guide vertical movement of said nail carrier sleeve in said casing.

3. The nail magazine as claimed in claim 1, wherein said casing is a hollow circular open frame member having a stepped nail-feeding wall in a peripheral open side thereof; said cover fits said casing and includes a nail-feeding wall formed in a peripheral open side thereof corresponding to the nail feeding wall of said casing and forming with the nail feeding wall of said casing said nail feed hole upon closing of said cover on said casing.

4. The nail magazine as claimed in claim 1, wherein said tubular flange of said magazine shaft has at least one guide groove; said nail carrier sleeve has at least one raised portion projecting from an inside wall thereof and respectively coupled to said at least one guide groove of said tubular flange to guide vertical movement of said nail carrier sleeve in said casing.

5. A nail magazine used in a power nailing hand tool to hold and feed a rolled belt of nails comprised of a plurality of substantially L-shaped nails fastened together by a belt, each nail of said belt of nails having a flat elongated nail body, an angled head extended from a top end of said nail body, a point extended from a bottom end of said nail body, and an upwardly extended and biased toothed strip on the middle of said nail body, the nail magazine comprising:

a casing,
a magazine shaft vertically disposed inside said casing at the center, said magazine shaft comprising an upright shaft upwardly extended from the center of a bottom wall inside said casing, a tubular flange formed integral with the periphery of said upright shaft and defining with the periphery of said upright shaft an annular groove, and a magazine spring mounted within said annular groove;
a nail carrier sleeve vertically movably mounted around said upright shaft and adapted to carry said rolled belt of nails and to support the angled heads of the nails of the inner layer of said rolled belt of nails;
said magazine spring supporting said nail carrier sleeve above said upright shaft; and
a cover hinged to said casing, said cover defining with said casing a nail feed hole when closed on said casing.

6. The nail magazine as claimed in claim 5, wherein said tubular flange of said magazine shaft has at least one guide groove; said nail carrier sleeve has at least one raised portion projecting from an inside wall thereof and respectively coupled to said at least one guide groove of said tubular flange to guide vertical movement of said nail carrier sleeve in said casing.

7. The nail magazine as claimed in claim 6, wherein said at least one guide groove each has a top open end, a short vertical section downwardly extended from said top open end, a long vertical section vertically extended toward a bottom side of said tubular flange, and a transverse section connected between a bottom end of said short vertical section and an upper part of said long vertical section, said long vertical section having two distal ends closed.

8. A nail magazine used in a power nailing hand tool to hold and feed a rolled belt of nails comprised of a plurality of substantially L-shaped nails fastened together by a belt, each nail of said belt of nails having a flat elongated nail body, an angled head extended from a top end of said nail body, a point extended from a bottom end of said nail body, and an upwardly extended and biased toothed strip on the middle of said nail body, the nail magazine comprising:

a casing;
a magazine shaft vertically disposed inside said casing at the center, said magazine shaft comprising an upright shaft upwardly extended from the center of a bottom wall inside said casing, and a nail carrier sleeve vertically movably mounted around said upright shaft and adapted to carry said rolled belt of nails and to support the angled heads of the nails of the inner layer of said rolled belt of nails,
said nail carrier sleeve includes safety means adapted to prevent direct contact of the toothed strips of the nails of said rolled belt of nails with the periphery of said nail carrier sleeve; and
a cover hinged to said casing, said cover defining with said casing a nail feed hole when closed on said casing.

9. The nail magazine as claimed in claim 8, wherein said safety means is a collar extended around the periphery of said nail carrier sleeve.

10. A nail magazine used in a power nailing hand tool to hold and feed a rolled belt of nails comprised of a plurality of substantially L-shaped nails fastened together by a belt, each nail of said belt of nails having a flat elongated nail body, an angled head extended from a top end of said nail body, a point extended from a bottom end of said nail body, and an upwardly extended and biased toothed strip on the middle of said nail body, the nail magazine comprising:

a casing;
a magazine shaft vertically disposed inside said casing at the center, said magazine shaft comprising an upright shaft upwardly extended from the center of a bottom wall inside said casing, and a nail carrier sleeve vertically movably mounted around said upright shaft and adapted to carry said rolled belt of nails and to support the angled heads of the nails of the inner layer of said rolled belt of nails;
a cover hinged to said casing, said cover defining with said casing a nail feed hole when closed on said casing;
said casing comprising a hollow circular open frame member having a stepped nail feeding wall in a peripheral open side thereof; and
and said cover fits said casing and includes a nail feeding wall formed in a peripheral open side thereof corresponding to the nail feeding wall of said casing and forming with the nail feeding wall of said casing said nail feed hole upon closing of said cover on said casing, said nail feeding wall of said casing defines an inwardly sloping upper tread, a lower tread, and a riser between said upper tread and said lower tread.

11. The nail magazine as claimed in claim 10, wherein the nail feeding wall of said cover defies two triangular steps and a vertical face disposed between said triangular steps.

* * * * *